Figure 2:
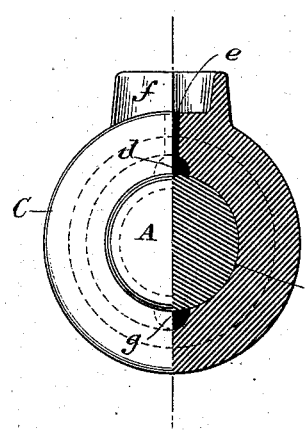

(No Model.)

G. JACKSON.
JOURNAL LUBRICATOR.

No. 254,771. Patented Mar. 7, 1882.

Attest:
R. F. Barnes.
W. Frisby.

Inventor:
George Jackson
by Parker W. Page.
Attorney.

UNITED STATES PATENT OFFICE.

GEORGE JACKSON, OF NEW YORK, N. Y., ASSIGNOR TO THE UNITED STATES ELECTRIC LIGHTING COMPANY, OF SAME PLACE.

JOURNAL-LUBRICATOR.

SPECIFICATION forming part of Letters Patent No. 254,771, dated March 7, 1882.

Application filed October 27, 1881. (No model.)

*To all whom it may concern:*

Be it known that I, GEORGE JACKSON, a subject of the Queen of Great Britain, and a resident of New York, in the county and State of New York, have invented certain new and useful Improvements in Self-Lubricating Journal-Bearings, of which the following is a specification, reference being had to the drawings accompanying the same.

The object of this my invention is to improve and simplify the construction of self-lubricating journals and their bearings, in order that they may distribute the lubricants thoroughly and evenly to all portions of the bearing-surfaces, and at the same time retain the oil and decrease the leakage arising from the pressure between the surfaces in contact and centrifugal action.

In journal-boxes of ordinary construction, in addition to the leakage, there is, where the shaft is run at a high rate of speed, or where the boxing is subject to any considerable amount of thrust, a constant tendency on the part of the journal to throw off small quantities of the oil, the amount depending on the rate of leakage and rapidity of revolution. Considerable annoyance is often caused by this tendency in places where neatness is desirable or necessary.

My invention is calculated to overcome these objections, and is carried out as shown in the drawings, where—

Figure 1:
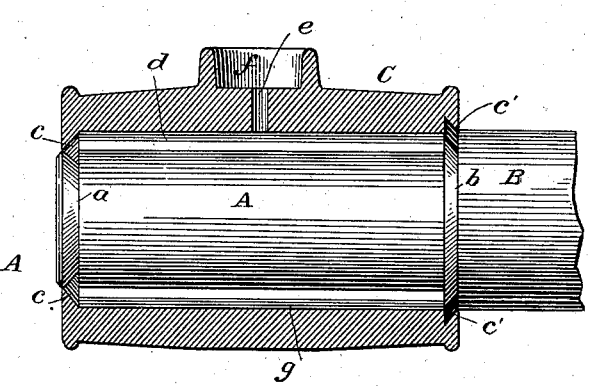

Figure 1 represents a central longitudinal section of a journal and bearing; Fig. 2, an end view, partly in section, of the same; and Fig. 3, a sectional view of a modified form of the invention.

A represents a journal, having an enlargement or shoulder, B, and fitting closely in a bearing, C, which has a correspondingly-enlarged bore at one end to admit the said shoulder. At the forward end of this journal, and extending circumferentially around it, is cut a V-shaped channel or groove, *a*, registering, when the journal is in place, with a corresponding groove, *c*, in the interior surface of the bearing. On that part of the enlargement B which enters the bearing C is formed a second V-shaped groove, *b*, similar to groove *a*, and registering, when the journal is in place, with a second annular groove, *c'*, in the interior surface of the enlarged portion of the bearing C.

In the upper interior surface of the bearing C is formed a longitudinal channel, *d*, extending from and connecting the annular groove *c* with the groove *c'*, and communicating by a suitable passage, *e*, with the oil cup or reservoir *f*. Diametrically opposite the longitudinal channel *d* is a channel, *g*, of similar character, and connecting the annular grooves *c* and *c'* at the lower side of the journal. The oil from the cup or reservoir *f* enters the channel *d* through the connecting-passage *e*, and is distributed to the surface of the journal as it passes in its revolution, any surplus oil or leakage arising from the pressure of the journal against the bearing-surface passing through the annular channels formed by grooves *a* and *c* and *b* and *c'* to the lower longitudinal channel, *g*, to be again distributed to the surface of the journal. The annular channels thus serve the double purpose of receptacles for receiving the leakage and connecting-passages between the distributing-grooves *d* and *g*.

Figure 3:
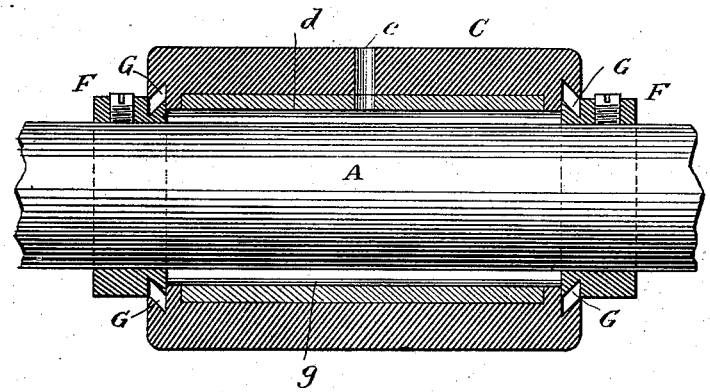

In the modification shown in Fig. 3, instead of forming the grooves in the body of the journal itself, a plain shaft is used, upon which are fastened, by set-screws or otherwise, collars or rings F F. These collars are grooved, as shown at G G, and fit in enlargements at each end of the journal-box in a manner precisely similar to the enlarged shoulder B in Fig. 1. In its action the modified form is substantially the same as the one previously described, the annular grooves acting simply to take up the surplus or leakage of oil and prevent its being thrown off by the journal, or, when communicating with the upper and lower grooves, as in the other cases, to distribute the leakage.

It is obvious that this mode of distributing and retaining the oil in a journal-bearing may be applied in many different ways to other forms of journal-bearings. All such modifications would be within the spirit of my invention, being simply variations of the same general principle.

Having thus described my invention, what I claim, and desire to secure by Letters Patent, is—

1. In a self-lubricating journal-bearing, the combination of a bearing having longitudinal recesses or channels connected at their ends by annular grooves with a journal having grooves adapted to register with the annular grooves in the journal, substantially as set forth.

2. In a self-lubricating journal and bearing, a journal having an enlarged shoulder adapted to fit in a corresponding enlargement of the bearing, and annular grooves at either end, in combination with a bearing having longitudinal recesses or channels and annular grooves in position to register with those in the journal, as described.

In testimony whereof I have hereunto set my hand this 19th day of October, 1881.

GEORGE JACKSON.

Witnesses:
R. F. BARNES,
W. FRISBY.